Jan. 5, 1960 W. W. KEITH 2,920,294

SONIC DELAY LINES

Filed Oct. 14, 1954 2 Sheets-Sheet 1

INVENTOR
WELDON WAYNE KEITH
BY Elmer J. Gorn
ATTORNEY

SONIC DELAY LINES
Filed Oct. 14, 1954 2 Sheets-Sheet 2
FIG. 4
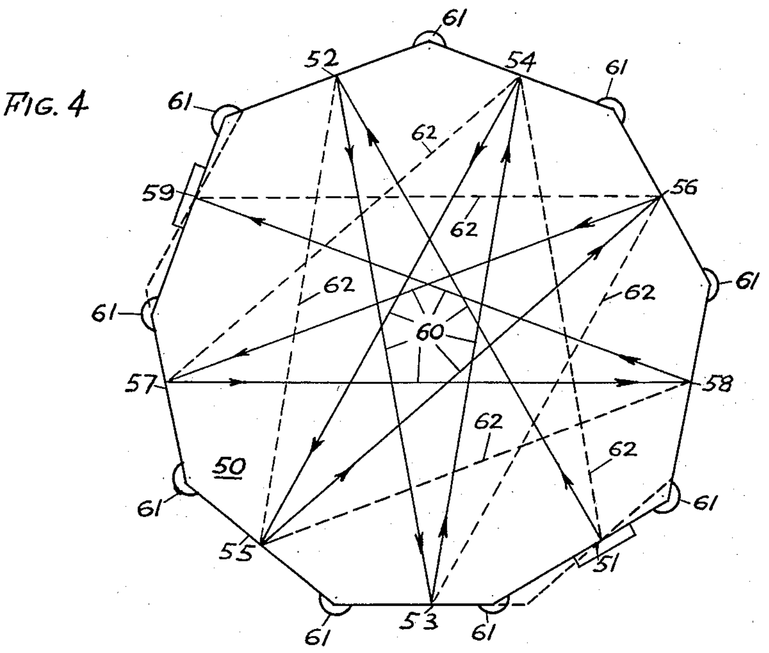
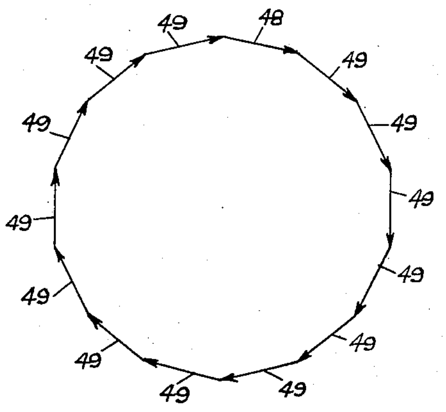
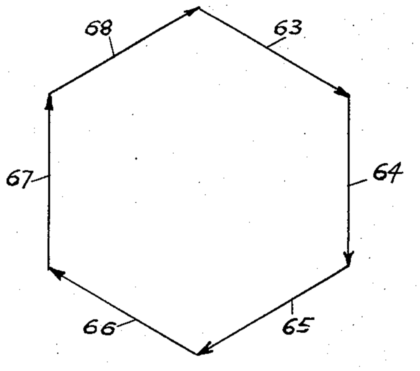
FIG. 3 FIG. 5
INVENTOR
WELDON WAYNE KEITH
BY Elmer J. Gorn
ATTORNEY

United States Patent Office 2,920,294

Patented Jan. 5, 1960

2,920,294

SONIC DELAY LINES

Weldon Wayne Keith, Sudbury, Mass., assignor to Raytheon Company, a corporation of Delaware Application October 14, 1954, Serial No. 462,350

6 Claims. (Cl. 333—30)

This invention relates to sonic delay lines, and more particularly to sonic delay lines of a type wherein relatively long time delays are accomplished by causing the sonic wave to be reflected a plurality of times, and, hence to traverse the sonic medium a plurality of times.

Sonic delay lines using a plurality of traverses of the sonic medium are well known. However, such devices attenuate the signals to be delayed such that the output signal from the delay medium is many decibels lower than the intensity input signal and, hence, there has always been some interference between the desired output signal and spurious signals due to the sonic energy traveling along undesired paths between the input and output, particularly along undesired paths that are shorter than the main signal delay path and, hence, subject to less attenuation by the medium than the signals traversing the main path. Attempts to overcome this difficulty by separating the paths by partitions have not produced the desired results, since this produces a more bulky device and the partitions, themselves, introduce reflections which further add to the spurious signals. In addition, many delay lines use sonic paths which intersect each other at angles and, hence, separation by partitions is not feasible.

This invention discloses that the signals traversing undesired signal paths within the medium may be substantially reduced at the output of the delay medium by causing a series of undesired signals to arrive at the output in different phases of a wave length of the frequency of the sonic signal such that the over-all sum of these signals at the output is substantially zero.

Briefly, this is accomplished by making the path lengths of the undesired paths in the sonic medium different from each other by a predetermined amount dependent on the number of undesired paths in the group of undesired paths to be cancelled and the frequency of the sonic signal. Specifically, this may be accomplished in a delay medium wherein reflections occur between a pair of substantially parallel bounding surfaces of the medium by making the surfaces slightly off parallel; for example, the distance between the surfaces at one end being substantially a wave length greater in the medium at the frequency of the sonic signals than the distance between the parallel surfaces at the other end thereof.

This invention further discloses that the cancellation of the undesired path signals is particularly useful in conjunction with means for restricting divergence of the signal wave traveling along the main delayed path. A particular restricting means is the use of reflecting areas at the bounding surfaces which are of a particular size, said areas being surrounded by a region which does not reflect the signal waves to the same degree, or in the same direction, as the desired reflecting areas.

This invention further discloses that the principle of cancellation of undesired path signals may be applied equally well to sonic delay lines using liquid delay mediums, such as mercury, and to sonic delay lines using solid mediums, such as quartz.

Other and further objects and advantages of this invention will be apparent as the description thereof progresses, reference being had to the accompanying drawings, wherein:

Fig. 3 illustrates a vector diagram showing how a family of undesired delay path signals cancel within the delay medium in the device illustrated in Figs. 1 and 2;

Fig. 4 illustrates a top plan view of a solid delay line embodying this invention; and Fig. 5 illustrates a vector diagram showing how a family of undesired delay path signals in the device shown in Fig. 4 cancel within the delay medium.

Figure 1:
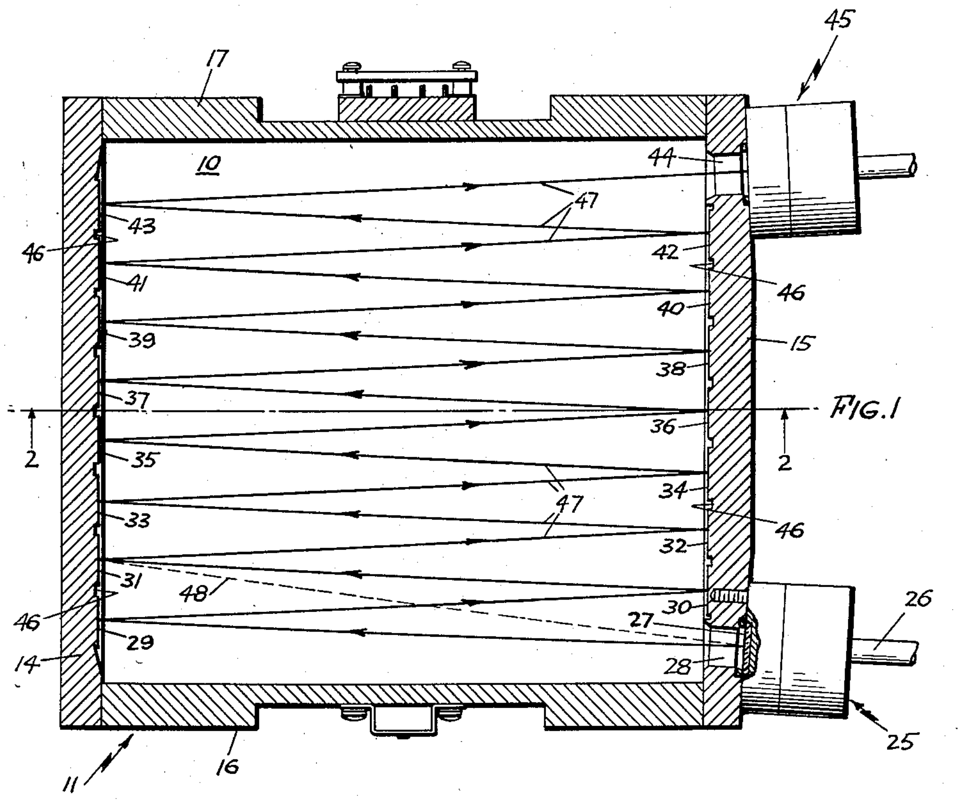
Fig. 1 illustrates a longitudinal cross-sectional view taken along line 1—1 of Fig. 2 of a liquid sonic delay line embodying the invention.
Figure 2:
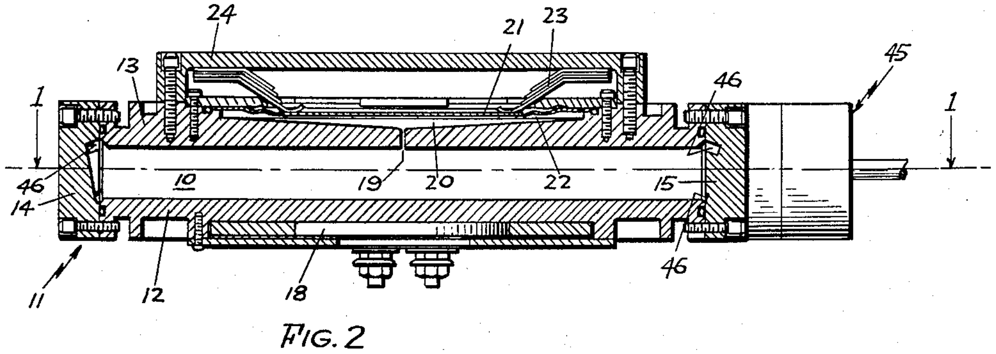
Fig. 2 illustrates a traverse cross-sectional view of the device illustrated in Fig. 1 taken along line 2—2 of Fig. 1.

Referring now to Figs. 1 and 2, there is shown a sonic delay line comprising a sonic delay medium 10, which may be, for example, mercury. The mercury 10 is contained in a substantially rectangular box-like structure 11, which comprises the case of the sonic delay line and acts as the bounding surfaces for the delay medium. Case 11 is made up of lower and upper cover plates 12 and 13, respectively, shown in Fig. 2, attached to which are side plates 14 and 15 and end plates 16 and 17, thus making a six-sided box-like structure. The box members are preferably made of a substantially rigid material which does not chemically react with the delay medium. It has been found that steel works well for this purpose.

An electric heater element 18 is provided beneath lower plate 12 whereby the temperature of the sonic medium contained in the box 11 is maintained substantially constant such that the device will have a constant time delay. Upper cover plate 13 has a small aperture 19 in the center thereof which connects the interior of the box 11 with a reservoir of mercury 20 above the box 11. Pressure is maintained on the reservoir 20 by means of a plate 21 on top of the reservoir attached to the upper cover member 13 by means of a diaphragm 22 and urged downwardly against the reservoir of mercury 20 by a spring 23, the entire reservoir diaphragm spring assembly being covered by a cover 24 bolted to upper plate 13.

The side plates 14 and 15 contain the input and output signal coupling structures as well as the reflecting surfaces for the desired delay main path in the medium in the particular embodiment illustrated in Figs. 1 and 2 of the invention. However, it is to be clearly understood that, if desired, the main delay path could be oriented to reflect from the end walls 16 and 17 and other shapes than the substantially rectangular cross-sectional area could be used for the container holding the liquid delay medium. For the embodiment illustrated herein, the side wall 15 has attached thereto the signal input coupling means 25, which may be a standard crystal transducer having provision for electrical connections 26 and applying signals to the transducer crystal 27, which is clamped by the housing of the transducer 25 to the outside of a hole 28 through side plate 15. This transducer is shown by way of example only, and any other standard transducer, such as a magnetostrictive transducer, could be used. The details of the transducer and a suitable structure for mounting the transducer on the plate 15 are described in more detail in patent, No. 2,685,067, issued July 27, 1954, to Beveridge et al.

The signal waves from transducer 25 are directed through the medium 10 to a reflecting area 29 on the opposite side wall 14. Area 29 is made highly reflective by lightly sandblasting the steel surface. From area 29 the wave is reflected back to a similar area 30 on plate 15 adjacent transducer 25 and, hence, back and forth between plates 14 and 15 reflecting from areas 31 through 43 sequentially until it reaches the other ends of plates 14 and 15 where it passes out through a hole 44 in plate 15 to an output transducer 45 similar to transducer 25.

Surrounding each of the areas 29 through 45 are annular areas 46 recessed into plates 14 and 15, the bottoms of the recessed areas being polished relatively smooth such that energy in the main signal path which diverges from the axis of the beam sufficiently to overlap any of the reflecting areas 29 through 43 impinges on the bottom of the annular areas 46 and is substantially absorbed in the steel. The annular areas 46 are also tilted such that any sonic energy reflected therefrom is directed upwardly toward upper plate 13 and is substantially absorbed thereby. The details of the annular areas and their functions are explained in greater length in the aforementioned patent.

The main signal delay path through the medium 10 is indicated by the solid line 47 beginning at the input transducer 25, reflecting successively through areas 29 through 43, and being picked up by the output transducer 45. A small amount of the energy in the main delay path 47 diverges over a greater area than that of the reflecting areas and their surrounding absorbing areas 46, hence, for example, a small amount of the input signal will impinge directly from input transducer 25 on area 31 thereby skipping two traverses of the sonic medium between side plates 14 and 15. The portion of the energy which impinges on area 31 directly from transducer 25 may then travel along the main delay path and appear at the output 45. This energy arrives earlier than the energy following the main delay path by substantially the time required for the energy to make two traverses through the medium 10 between the plates 14 and 15. The path of this energy is indicated by the dotted line 48 between the transducer 25 and the reflecting area 31. The amount of this signal arriving earlier by a time equal to two traverses of the medium between the side plates is many decibels below the main signal strength for the divergence of the beam along any one traverse. However, divergence of the beam occurs during each traverse along the path. For example, energy traveling in areas from 29 to 30 will have a small portion thereof impinging on area 32 which effectively skips two traverses of the medium and, hence, arrives at the output transducer 45 two traverses ahead of the main signal. This is true for energy reflected from areas 29 through 41 as well as energy sent directly from input transducer 25 to area 31, hence making fourteen separate signals which arrive at the output transducer 45 ahead of the main signal by a time substantially equal to two traverses of the medium 10. If side plates 14 and 15 are exactly parallel, this group of fourteen undesired signals will all be in phase and will hence add up producing an undesirably large spurious signal not delayed in the device by the correct amount.

The undesirable spurious signal made up of fourteen separate signals may be substantially reduced or eliminated at the output transducer 45 by causing the fourteen undesired signals to arrive at the output transducer 45 out of phase with each other by predetermined amounts such that a vector diagram of these signals will add up to zero. This may be accomplished by making the distance of the traverse between the reflecting areas 42 and 43 different from the distance between the reflecting areas 29 and 30 by a distance substantially equal to a wave length in the medium 10 of the frequency of the signal propagating through the medium 10.

Referring now to Fig. 3, there is shown a vector diagram illustrating how the spurious signals which skip two traverses of the medium will add up with side plates 14 and 15 converging from the input 25 to the output 45 by a distance of substantially a wave length within the medium. The vector 48 is chosen arbitrarily to indicate the phase position of a signal arriving at the output 45 after skipping the reflecting surface 29 and going directly from the transducer 25 to the reflecting surface 31 and, hence, along the normal delayed path indicated by solid line 47. The vector 49 is delayed in phase somewhat from vector 48 in Fig. 3 and represents the signal going from the transducer 25 to the reflecting surface 29 skipping reflecting surfaces 30 and 31 and going directly to reflecting surface 32 and, hence, along the main delay path 47 to the output 45. Since vector 49 skipped a shorter pair of traverses of the medium 10 than vector signal 48, it is delayed more than the vector signal 48. Similarly, the other vectors 49 illustrate signals skipping, respectively, sequential pairs of reflecting surfaces 31 through 43 with each of the vectors 49 successively lagging its predecessor in phase by the same predetermined amount such that the head of the last vector 49 just meets the tail of vector 48, hence closing the vector loop and producing a zero output result from this set of signals.

For the configuration shown in Figs. 1 and 2, the family of undesired or spurious signals represented by vectors 48 and 49 in Fig. 3, present the strongest potential interference with the desired delay signal since they require the least divergence of the main beam produced and, having shorter paths from the main signal, are attenuated less by the medium than the main signal. Spurious signals due to divergence backward, that is, a beam which normally impinges on area 31, partially impinging on area 29, produces substantially less interference since the energy on reflection is directed back even further. Spurious signals produced by jumps of four reflecting surfaces, such as energy going directly from transducer 25 to reflecting area 33, produces a considerably lower interfering signal than that illustrated by the vectors 48 and 49, since the degree of divergence from the main signal required is substantially twice as much to produce this spurious signal as those producing vectors 48 and 49 and, hence, the magnitude of the signal will be down many decibels below that producing vector signals 48 and 49. In addition, tapering of the sides 14 and 15 in the manner described will produce substantial cancellation of this second type of family interference signals in a manner similar to that illustrated in Fig. 3.

It has been found that, for a mercury delay line constructed as shown in Figs. 1 and 2, the spacing between the side plates 14 and 15 at the end adjacent the input transducer 25 differs from the spacing at the ends of output transducer 45 by about .006 inch if the carrier frequency of the delay signals in the medium is approximately nine megacycles. This is approximately equal to one wave length of the signal frequency. The particular delay line illustrated in Figs. 1 and 2 has an over-all delay of approximately 2500 microseconds utilizing a total path length indicated by the solid lines 47 in the medium 10 of approximately 135 inches. If desired, a greater number of traverses could be achieved in the same cross-sectional area if the delay medium were made greater in depth and the reflecting surfaces tilted alternately to deflect the sonic beam slightly upward or downward in the manner disclosed in the aforementioned patent.

Referring now to Fig. 4, there is shown a solid sonic delay line in which the principles of this invention can be incorporated. The solid delay line, shown here diagrammatically, comprises a block of material 50 used as the sonic delay medium. While any well-known sonic delay medium may be used, for best results, a high optical grade of fused quartz should be used. As shown here, the medium 50 is in the form of a polygon having nine sides or facets 51 through 59, which may be, for example, several inches across the face and an inch or two thick. The input signal is coupled to the delay medium by means of a transducer, which may be of any desired type, such as a crystal or magnetostrictive transducer, contacting one facet of the polygon, as shown at 51. The energy then follows the path through the medium shown in the solid line 60 reflecting from facets 52 through 58 successively and is coupled out of the delay medium by a transducer connected to facet 59 similar to the input transducer coupled to facet 51. It may be noted that the polygonal shape of the medium 50 is symmetrical about its axis except for the facets 51 and 59 which have been rotated slightly from their positions of symmetry indicated by the dotted lines such that the transducers on facets 51 and 59 will be oriented perpendicular to the desired delay path through the medium 50.

Positioned at the corners of facets 51 and 59 are ridges 61 of energy absorbing material, such as indium, which couple out at these points sonic energy which diverges from the main delay path sufficiently to impinge on the portions of the facets backed by the ridges 61. This serves to confine the beam in a manner similar to that of the recessed areas 46 in Figs. 1 and 2. If desired, ridges 61 may be omitted or may be applied in different forms or in different shapes. The portions of the facets between the ridges 61 act as substantially complete reflectors for the sonic energy in the medium because of the high difference in sonic impedance between the fused quartz medium and the air space adjacent the facets 51 through 59. The spurious signals which are possible in this type of device are of the type produced by energy going directly from the input transducer at 51 to facet 54 skipping facets 52 and 53, as shown by dotted line 62, and then continuing along the main path 60 to the output. For a substantially symmetrical polygonal shape as shown herein, there is an entire family of these spurious signals each occurring at an amplitude level many decibels below the main signal appearing at the output transducer. However, all the spurious signals in a particular family, for instance those produced by a single skip along one of the dotted lines 62 through the medium 50, will add up in phase if the distance of the paths skipped is equal for each of the signals as will be the case in a symmetrical polygon. This is overcome by making the distance between the facet 59 and the facet 58 shorter than the distance between the facet 51 and the facet 52 by substantially a wave length of the sonic delay signal within the medium 50, and the distances of the paths between facets in between the first and the last paths mentioned above increasing successively by the same predetermined portion of a wave length. Under these conditions, the spurious signals described above which appear at the output transducer 59 will add up according to the vector diagram shown in Fig. 5 wherein the vector 63 may be arbitrarily chosen to represent the phase position of the spurious signal caused by energy going directly from facet 51 to facet 54 and, hence, along the conventional delay path 60 to the output. Vectors 64 through 68 illustrate the phases of spurious signals produced by the succeeding jumps illustrated by the dotted lines 62, each of dotted lines 62 indicating the case where the signal going from the input to the output diverges only once from the conventional path 60. As may be seen, the vector diagram shown in Fig. 5 closes, thereby indicating that spurious signals developed by the divergence along the dotted line 62 cancel out within the medium.

Preferably, the signal wave in the solid delay medium is of the transverse, or shear, wave type, and it is desirable that it be polarized perpendicular to the upper and lower faces of the delay medium whereby interchange of signal energy between the transverse mode and the compressional mode is avoided. In the species of Figs. 1 and 2, compressional wave signals are used since the mercury used as the delay medium, being liquid, will not support transverse, or shear, waves.

This completes the description of the embodiments of the invention illustrated herein. However, many modifications thereof are apparent to persons skilled in the art without departing from the spirit and scope of this invention. For example, any particular configurations of delay paths within the mediums and any desired configuration of the delay medium could be used, such as one wherein the energy was reflected several successive times from the reflecting surfaces at different reflecting angles and the principle of spurious signal cancellation within the medium is not limited to cancellation of spurious signals of equal amplitude, but may be used with spurious signals of different amplitudes by adjusting the phase positions of the vectors to produce a vector addition of the signals equal to zero. The use of cancellation of the signals within the medium may be used with or without the additional absorbing means and devices illustrated herein to absorb portions of the beam which diverge too widely from the desired path within the medium. Accordingly, it is requested the foregoing invention be not limited to details of the embodiments disclosed herein, except as defined by the appended claims.

What is claimed is:

1. A vibrational wave energy delay line comprising a medium capable of supporting the propagation of a beam of vibrational waves therein, said medium being bounded by a plurality of surfaces each having at least one area capable of substantially reflecting said vibrational waves, said surfaces being oriented to provide a chain of successive reflections of said vibrational waves between successive of said reflecting areas along a main signal path in said medium, the physical distance between the last two of said successive reflecting areas being different from the physical distance between the first two of said successive reflecting areas measured in the same angular vector direction thus causing signals traversing undesired paths in said medium to combine in a substantially polygonal vector diagram and substantially cancel in said medium, and signal input and output means coupled to said medium.

2. A vibrational wave energy delay line comprising a medium capable of supporting the propagation of a beam of vibrational waves therein, and signal input and output means coupled to said medium and oriented to produce a predominant signal delay path through said medium, said medium being bounded by surfaces having at least one area capable of substantially reflecting said vibrational waves, said surfaces being further oriented to provide a chain of successive reflections of said vibrational waves between successive of said reflecting areas along said predominant signal delay path, the physical distance between each of said successive reflecting areas differing from each other by the same predetermined portion of a wavelength in the same angular vector direction whereby undesired spurious signals combine in a substantially polygonal vector diagram to substantially cancel in said medium.

3. A vibrational wave energy delay line comprising a solid medium capable of supporting the propagation of a beam of vibrational waves therein, said medium being bounded by a plurality of surfaces each having at least one area capable of substantially reflecting said vibrational waves, signal input and output means coupled to said medium, said surfaces being oriented to provide a chain of successive reflections of said vibrational waves between successive of said reflecting areas along a main signal path in said medium, the physical distance between the last two of said successive reflecting areas being different from the physical distance between the first two of said successive reflecting areas and progressing in the same angular vector direction thus causing signals traversing undesired paths in said medium to combine in a substantially polygonal vector diagram and substantially cancel.

4. A vibrational wave energy delay line comprising a medium capable of supporting the propagation of a beam of vibrational waves therein, and signal input and output means coupled to said medium and oriented to produce a predominant signal delay path through said mediumum, said medium being bounded by surfaces having at least one area capable of substantially reflecting said vibrational waves, said surfaces being further oriented to provide a chain of successive reflections of said vibrational waves between successive of said reflecting areas along said predominant signal delay path, the physical distance between the last two of said successive reflecting areas differing from the physical distance between the first two of said successive reflecting areas by a distance substantially equal to a wavelength of said vibrational waves in said medium.

5. A vibrational wave energy delay line comprising a rectangular medium capable of supporting the propagation of a beam of vibrational waves therein, said medium being bounded by a plurality of surfaces capable of substantially reflecting said vibrational waves, and signal input and output means coupled to said medium and oriented to produce a predominant signal delay path through said medium, said path including a plurality of successive reflections from areas on said surfaces, the physical distance between the last two of said successive reflecting areas being different from the physical distance between the first two of successive reflecting areas by a distance substantially equal to a wavelength of said vibrational waves whereby signals traversing paths other than said predominant signal delay path substantially cancel each other in said medium.

6. A vibrational wave energy delay line comprising a medium capable of supporting the propagation of a beam of vibrational waves therein, said medium being bounded by a plurality of surfaces each having at least one area capable of substantially reflecting said vibrational waves, signal input and output means coupled to said medium, said surfaces being oriented to provide a chain of successive reflections of said vibrational waves between successive of said reflecting areas along a main signal path in said medium, the physical distance between the last two of said successive reflecting areas differing from the physical distance between the first two of said successive reflecting areas by a distance substantially equal to a wavelength of said vibrational waves, and means adjacent said reflecting areas for restricting the cross-sectional size of said beam.

References Cited in the file of this patent

UNITED STATES PATENTS

| | | |
|---|---|---|
| 2,505,515 | Arenberg | Apr. 25, 1950 |
| 2,565,725 | Frederick et al. | Aug. 28, 1951 |
| 2,685,067 | Beveridge et al. | July 27, 1954 |
| 2,823,355 | Arenberg | Feb. 11, 1958 |